United States Patent
Capouilliet et al.

(10) Patent No.: US 7,646,532 B2
(45) Date of Patent: Jan. 12, 2010

(54) OPTICAL DEVICE FOR SUPPRESSING DOUBLE RAYLEIGH BACKSCATTERING NOISE, AND AN INSTALLATION INCLUDING THE DEVICE

(75) Inventors: Sylvain Capouilliet, Lecelles (FR); Erwan Pincemin, Commenec'h (FR)

(73) Assignee: France Telecom, Paris (FR)

( * ) Notice: Subject to any disclaimer, the term of this patent is extended or adjusted under 35 U.S.C. 154(b) by 0 days.

(21) Appl. No.: 10/551,597

(22) PCT Filed: Mar. 30, 2004

(86) PCT No.: PCT/FR2004/000799

§ 371 (c)(1), (2), (4) Date: Oct. 2, 2006

(87) PCT Pub. No.: WO2004/091122

PCT Pub. Date: Oct. 21, 2004

(65) Prior Publication Data

US 2007/0110444 A1    May 17, 2007

(30) Foreign Application Priority Data

Mar. 31, 2003   (FR) .................................. 03 03967

(51) Int. Cl.
*H04B 10/17* (2006.01)
*H04B 10/12* (2006.01)

(52) U.S. Cl. ..................................... 359/334; 359/337.2

(58) Field of Classification Search ................. 359/334, 359/337.2

See application file for complete search history.

(56) References Cited

U.S. PATENT DOCUMENTS

| 6,188,509 | B1 * | 2/2001 | Lee et al. .................. 359/341.2 |
| 6,388,800 | B1 * | 5/2002 | Christodoulides et al. ... 359/334 |
| 6,493,133 | B1 * | 12/2002 | Liang et al. .................. 359/349 |
| 6,674,566 | B2 * | 1/2004 | Fludger et al. .............. 359/334 |
| 6,697,575 | B1 * | 2/2004 | Liang et al. .................. 398/104 |
| 6,862,132 | B1 * | 3/2005 | Casaccia et al. ............. 359/334 |
| 6,867,907 | B2 * | 3/2005 | Inoue et al. .................. 359/334 |
| 6,985,283 | B1 * | 1/2006 | Islam et al. .................. 359/334 |

(Continued)

FOREIGN PATENT DOCUMENTS

EP    0 789 432 A1   8/1997

(Continued)

OTHER PUBLICATIONS

Chien-Jen Chen et al.; "Time-Domain Characterization of Transient Effects and Double Rayleigh Backscattering Noise in Raman Amplifiers"; Optical Fiber Communications Conference; vol. 1, Mar. 17, 2002; pp. 634-636.

*Primary Examiner*—Eric Bolda
(74) *Attorney, Agent, or Firm*—Epstein Drangel; Bazerman & James, LLP

(57) ABSTRACT

An optical signal processor device (14) intended to be fitted to means (10) for optically transmitting an information-carrying signal (S) comprises means (20, 22) for suppressing backscattered signals (RS) in the optical transmission means (10), an optical propagation medium (16) intended to be connected in parallel with the optical transmission means (10), divertor means (18, 20) for diverting the backs-propagated signals (P, RS) in the optical transmission means (10) into the optical propagation medium (16), and signal discrimination means (22) connected to the optical propagation medium (16).

15 Claims, 2 Drawing Sheets

U.S. PATENT DOCUMENTS

| | | | |
|---|---|---|---|
| 7,035,545 B2 * | 4/2006 | Meli et al. | 398/84 |
| 7,038,840 B1 * | 5/2006 | Yam | 359/334 |
| 7,212,281 B2 * | 5/2007 | Tanigawa et al. | 356/73.1 |
| 7,242,519 B2 * | 7/2007 | Torii et al. | 359/334 |
| 2001/0024542 A1 * | 9/2001 | Aina et al. | 385/24 |
| 2002/0067526 A1 * | 6/2002 | Park et al. | 359/127 |
| 2002/0081069 A1 | 6/2002 | Yeniay et al. | |
| 2002/0159132 A1 | 10/2002 | Grochocinski et al. | |
| 2003/0117692 A1 * | 6/2003 | Tanaka et al. | 359/334 |
| 2004/0042061 A1 * | 3/2004 | Islam et al. | 359/334 |
| 2005/0174563 A1 * | 8/2005 | Evans et al. | 356/73.1 |

FOREIGN PATENT DOCUMENTS

| | | |
|---|---|---|
| JP | 2001185787 | 6/2001 |
| WO | WO 02/03579 A2 | 1/2002 |

* cited by examiner

OPTICAL DEVICE FOR SUPPRESSING DOUBLE RAYLEIGH BACKSCATTERING NOISE, AND AN INSTALLATION INCLUDING THE DEVICE

The present invention relates to an optical signal processor device for suppressing double Rayleigh backscattering noise and to an optical signal transmission installation including the device.

To be more precise, the invention relates to an optical device adapted to be fitted to means for optically transmitting an information-carrying signal and including means for suppressing backscattered signals in the optical transmission means.

Prior art optical devices of the above kind aiming at suppressing all backscattering noise in a transmission optical fiber, generally include an isolator that is disposed on the optical transmission fiber and allows optical signals to pass in one direction only, i.e. in the direction of transmission of the information-carrying signal, but blocks all transmission of signals in the other direction, in particular backscattered signals in the optical fiber.

However, in long-haul high-bit rate optical transmission applications, it is especially beneficial to amplify the signal regularly along the transmission optical fiber by means of distributed Raman amplification, which has the advantage of being effective over a wider band whilst improving the signal-to-noise ratio compared to a conventional localized optical amplifier.

Distributed Raman amplification is effected by injecting a back-propagated laser light signal known as the pump signal into the transmission optical fiber. The wavelength of the pump signal is generally about 100 nanometers (nm) shorter than the wavelength of the transmitted information-carrying signal, i.e. 1450 nm to amplify an information-carrying signal whose carrier wavelength is 1550 nm, for example.

However, distributed Raman amplification gives rise to a new problem in that it generates double Rayleigh backscattering noise that interferes with the information-carrying signal and that generates beat noise in the receiver at the end of the transmission. This noise degrades propagation quality.

Using an isolator in this situation is not ideal because although the isolator suppresses part of the double Rayleigh backscattering noise, it also suppresses the back-propagated pump signal, which requires a second distributed Raman amplification system to be installed on the transmission optical fiber in order to amplify the signal on the upstream side of the isolator. That solution is costly and does not discriminate between the Rayleigh backscattering signal and the pump signal in the transmission fiber.

The invention aims to remedy this problem by providing an optical signal processor device capable of suppressing only a predetermined portion of the backscattered signals, in particular of suppressing Rayleigh backscattering noise back-propagated in the optical transmission means using distributed Raman amplification.

The invention therefore consists in an optical signal processor device intended to be fitted to means for optically transmitting an information-carrying signal, said device comprising means for suppressing backscattered signals in the optical transmission means and being characterized in that it comprises an optical propagation medium intended to be connected in parallel with the optical transmission means, divertor means for diverting the back-propagated signals in the optical transmission means into said optical propagation medium, and signal discrimination means connected to the optical propagation medium.

Although it is impossible to discriminate the information-carrying signal in the optical transmission means, for example by filtering, because the wavelengths of the Rayleigh backscattering signal and the information-carrying signal are the same, such discrimination is possible if the backscattered and back-propagated signals are diverted to a specific optical propagation medium to which discrimination means are connected. It is therefore possible to suppress Rayleigh backscattering noise and to allow other back-propagated signals to pass, in particular a pump signal, if those signals have different wavelengths.

This solution does not require distributed Raman amplification on the upstream side of the optical signal processor device.

An optical signal processor device of the invention may additionally have one or more of the following features:
- the divertor means comprise two circulators each disposed at one of the points of connection of the optical propagation medium to the optical transmission means to cause the information-carrying signal to travel in the optical transmission means and to cause the back-propagated signals to travel in the optical propagation medium between the two circulators;
- it further comprises an optical functional module disposed on the optical transmission means between the two circulators;
- the optical functional module comprises an optical add/drop multiplexer for adding and dropping wavelengths and/or an optical switch and/or a polarization mode dispersion compensator and/or an optical regenerator;
- the signal discrimination means comprise a band-pass filter centered on the wavelength of the Raman pump signal intended to be retro-propagated in the optical transmission means;
- the signal discrimination means comprise a Bragg grating fiber whose reflection wavelength corresponds to the wavelength of the Rayleigh backscattering signal derived from the information-carrying signal;
- when the device is adapted to be fitted to means for optically transmitting a plurality of information-carrying signals, the signal discrimination means comprise a plurality of Bragg gratings disposed in series with reflection wavelengths corresponding to respective wavelengths carrying backscattered signals derived from the plurality of information-carrying signals;
- the signal discrimination means comprise an optical signal demultiplexer adapted to transmit only certain signals of predetermined wavelengths and associated with an optical signal multiplexer; and
- the optical transmission means include a line optical fiber and the optical propagation medium comprises an optical fiber portion.

The invention also consists in an optical device for suppressing Rayleigh backscattering noise comprising an optical signal processor device as described above.

Finally, the invention further consists in an optical signal transmission installation comprising an optical fiber for transmitting an information-carrying signal and a distributed Raman amplification system, characterized in that it further comprises an optical signal processor device as described above.

The invention will be better understood from the following description, which is given by way of example only and with reference to the appended drawings, in which:

FIG. 1 shows a transmission optical fiber 10 forming the horizontal axis of a diagram that shows how the power of an information-carrying signal S varies along the optical fiber 10.

Figure 1:
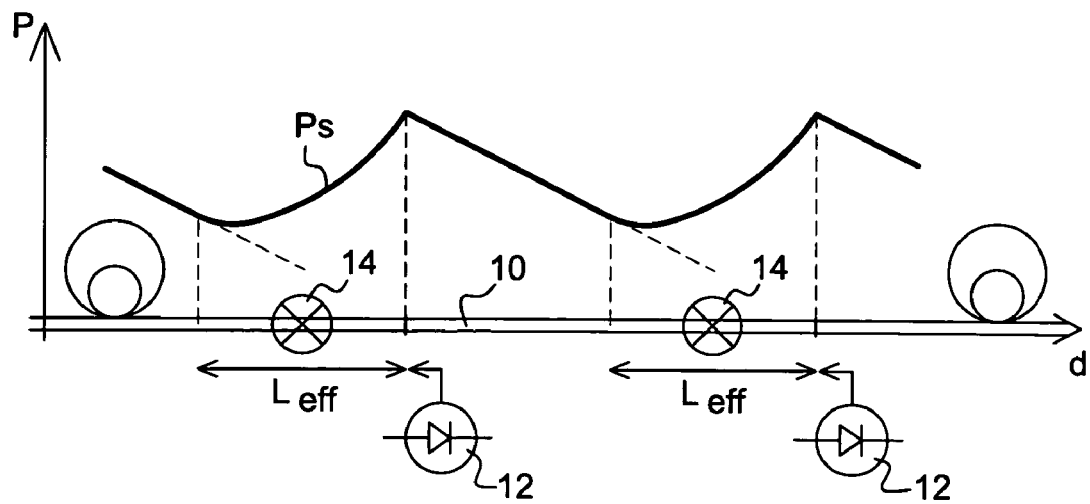
FIG. 1 is a diagram of the evolution of the power of a signal transmitted in an optical fiber fitted with a distributed Raman amplification system.

Pump signal generators 12 are connected to the transmission optical fiber 10 for back-propagating a pump signal P in the optical fiber at certain locations that are generally regularly spaced, for example once every 100 kilometers (km).

The term "back-propagation" as applied to a signal refers to that signal propagating in the opposite direction to the information-carrying signal transmitted by the optical fiber 10.

The back-propagated pump signal amplifies the information-carrying signal S over an effective length $L_{\it eff}$ of the transmission optical fiber 10 of about twenty kilometers.

Accordingly, the information-carrying signal S, which tends to become attenuated as it propagates along the transmission optical fiber 10, is amplified by the pump signal P introduced by one of the generators 12 into the optical portion of the transmission optical fiber 10 at a distance $L_{\it eff}$ upstream from this generator 12.

An optical signal processor device 14 of the invention is inserted into the same portion of the transmission optical fiber 10 to suppress Rayleigh backscattering noise caused by the presence of the generator 12 and to pass the pump signal.

Figure 2:
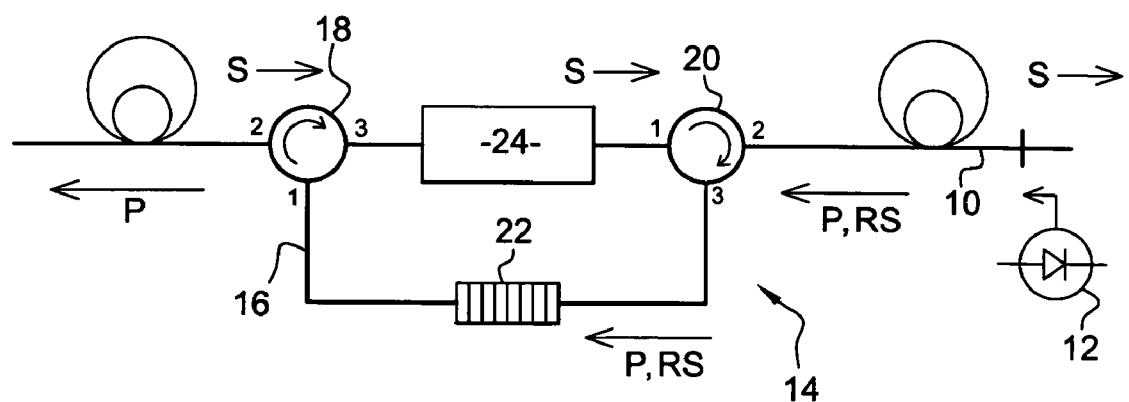
FIG. 2 is a diagram of a first embodiment of a signal processor device of the invention installed on the FIG. 1 optical fiber.

As shown in FIG. 2, in a first embodiment of the invention, the optical device 14 comprises an optical fiber portion 16 connected in parallel with the transmission optical fiber 10 by means of two circulators 18 and 20 each situated at one end of the optical fiber portion 16. Each circulator 18, 20 has three terminals, two of which are connected to the transmission optical fiber 10 by inserting the circulators therein, and one of which is connected to one of the ends of the optical fiber portion 16.

The first circulator 18 of the two circulators encountered by the information-carrying signal S is disposed on the transmission optical fiber 10 so that:

a signal coming from the fiber portion 16 is directed into the transmission fiber 10 in the back-propagation direction;

a signal coming from the transmission fiber 10 in the propagation direction of the information-carrying signal S is directed toward the transmission fiber 10, still in the propagation direction of the information-carrying signal S; and a signal coming from the transmission fiber 10 in the back-propagation direction is stopped and suppressed.

The second circulator 20 is disposed on the transmission fiber 10 at the other end of the fiber portion 16 so that:

a signal coming from the transmission optical fiber 10 in the propagation direction of the information-carrying signal S is directed toward the transmission fiber 10, still in the propagation direction of the information-carrying signal S;

a signal coming from the transmission fiber 10 in the back-propagation direction is directed into the optical fiber portion 16; and a signal coming from the optical fiber portion 16 is stopped and suppressed.

Accordingly, the information-carrying signal S propagating in the transmission fiber 10 in the propagation direction passes first through the first circulator 18. At the output of the circulator 18 it continues to propagate in the propagation direction in the transmission fiber 10 until it reaches the input of the second circulator 20, at the output of which it continues to propagate in the transmission fiber 10 in the propagation direction.

However, the pump signal P and the Rayleigh backscattering noise RS caused by the presence of the generator 12 on the transmission fiber 10 propagate in the direction opposite to the information-carrying signal S. These two backscattered signals arrive first at the input of the second circulator 20 and are diverted thereby into the optical fiber portion 16. They then reach the input of the first circulator 18 situated at the other end of the optical fiber portion 16 and are again directed into the transmission fiber 10 in the back-propagated direction.

Thus the two circulators 18 and 20 connecting the optical fiber portion 16 to the transmission fiber 10 form means for diverting the back-propagated signals P and RS in the transmission fiber 10 into this optical fiber portion 16.

The signal processor device 14 further comprises signal discrimination means connected to the optical fiber portion 16 in which the pump signal P and the Rayleigh backscattering noise RS propagate.

These discrimination means comprise a band-pass filter, for example, whose center frequency corresponds to the wavelength of the pump signal P and which blocks in particular signals with a wavelength equal to that of the Rayleigh backscattering noise RS, which is about 100 nm longer than that of the pump signal.

Accordingly, the back-scattered signals propagating along the optical fiber portion 16 are passed through the band-pass filter 22 so that only the pump signal propagates to the filter output. Accordingly, the filter 22 constitutes means for discriminating backscattered signals propagating in the optical fiber portion 16, further enabling suppression of the Rayleigh backscattering signal by filtering that passes only the pump signal P.

The band-pass filter 22 may be replaced by a Bragg grating fiber 22 whose reflection wavelength corresponds to the wavelength of the backscattering noise RS.

The Bragg grating fiber 22 is known in the art and is such that:

signals whose wavelength is close to the reflection wavelength of the Bragg grating are reflected by the Bragg grating; and signals whose wavelength is far from the reflection wavelength of the Bragg grating, in particular the pump signal P, are transmitted by the Bragg grating.

Accordingly, the pump signal P propagating in the optical fiber portion 16 passes through the Bragg grating 22 and is directed by the circulator 18 into the transmission fiber in the back-propagation direction.

However, the Rayleigh backscattering signal RS propagating in the same optical fiber portion 16 is reflected by the Bragg grating 22 toward the second circulator 20, which stops and suppresses it, serving as a filter.

Optionally, the optical signal processor device 14 includes an optical functional module 24 on the transmission fiber 10 between the two circulators 18 and 20, which module comprises, for example, an optical add/drop multiplexer for adding and dropping wavelengths, an optical switch, a polarization mode dispersion compensator, an optical generator, or a combination of two or more of the above.

Figure 3:
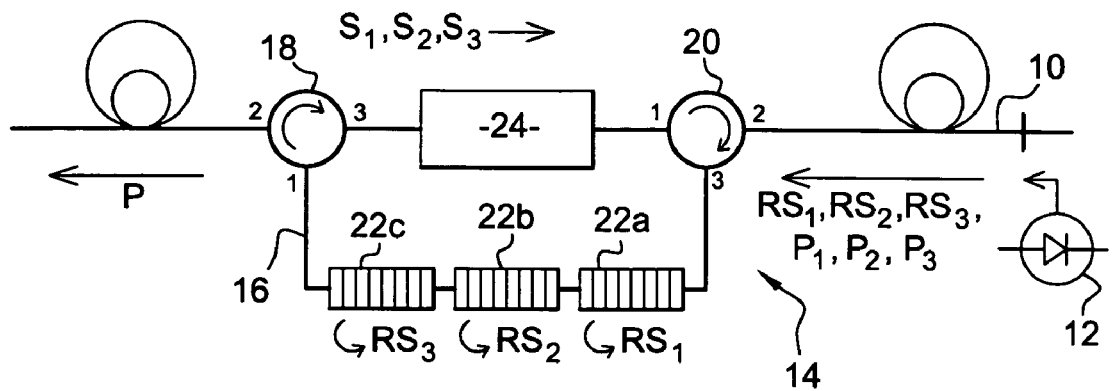
FIG. 3 is a diagram of a second embodiment of a signal processor device of the invention.

FIG. 3 shows a second embodiment in which the transmission optical fiber 10 transmits a plurality of information-carrying signals, for example three signals $S_1$, $S_2$, and $S_3$ that propagate at different wavelengths $\lambda_1$, $\lambda_2$, and $\lambda_3$.

The distributed Raman amplification system in the generator 12 generates three Raman pump signals $P_1$, $P_2$, and $P_3$.

The propagation of these three signals further induces the back-propagation of three Rayleigh backscattering noise signals $RS_1$, $RS_2$, and $RS_3$, together with the pump signals $P_1$, $P_2$, and $P_3$.

In this case, the optical fiber portion 16 comprises three Bragg grating fibers 22a, 22b, and 22c each of which is centered on one of the wavelengths of the Rayleigh backscattering noise signals $RS_1$, $RS_2$, and $RS_3$.

The three Bragg grating fibers are simply disposed in series, and each reflects a portion of the backscattered signal propagating in the optical fiber portion 16, respectively the backscattering noise $RS_1$, induced by the signal $S_1$, the backscattering noise $RS_2$ induced by the signal $S_2$, and the backscattering noise $RS_3$ induced by the signal $S_3$.

However, the three Raman pump signals $P_1$, $P_2$ and $P_3$ are transmitted in their entirety through the Bragg grating fibers 22a, 22b, and 22c.

Figure 4:
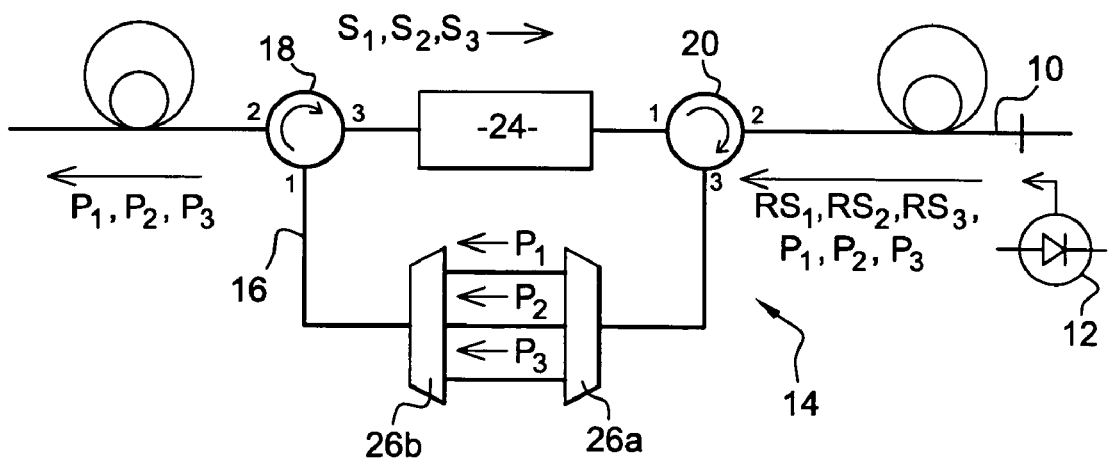
FIG. 4 is a diagram of a third embodiment of a signal processor device of the invention.

FIG. 4 shows a third embodiment in which the transmission optical fiber 10 also transmits a plurality of information-carrying signals $S_1$, $S_2$, and $S_3$, as in the second embodiment.

Here, however, the optical fiber portion 16 includes a demultiplexer 26a associated with a multiplexer 26b. The demultiplexer 26a passes only the Raman pump signals $P_1$, $P_2$, and $P_3$ on three optical fiber portions connected in parallel between the demultiplexer 26a and the multiplexer 26b.

Accordingly, all the back-propagated signals in the optical fiber portion 16 reach the input of the demultiplexer 26a. Of these signals, only the three pump signals $P_1$, $P_2$, and $P_3$ are fed to the output of the multiplexer 26b to be re-injected into the line optical fiber 10. The Rayleigh backscattering noise signals $RS_1$, $RS_2$, and $RS_3$ are filtered out by the demultiplexer 26a.

It is clear that an optical signal processor device of the invention suppresses all Rayleigh backscattering noise whilst allowing propagation of the pump signal in the transmission fiber 10 in the back-propagation direction downstream and upstream of the optical signal processor device.

This system enables distributed Raman amplification to be used in an optical signal transmission system at lower cost, solving the Rayleigh backscattering noise problem.

The invention claimed is:

1. An optical signal processor device for use with means (10) for optically transmitting an information-carrying signal and a back-propagated pump signal for amplifying said information-carrying signal, said device comprising means for suppressing backscattered signals in the optical transmission means and comprising:

an optical propagation medium arranged for being connected in parallel with the optical transmission means, divertor means being arranged for connecting, in parallel, at two connection points, the optical propagation medium to the optical transmission means and being arranged for diverting to this optical propagation medium, said pump signal and a Rayleigh backscattering signal propagating in the opposite direction of the information-carrying signal in the optical transmission means, at least a portion of the means for optically transmitting an information-carrying signal extending between the two divertor means, and wavelength discrimination means for discriminating between said pump signal said Rayleigh backscattering signal, said discrimination means being connected to the optical propagation medium, between the two connection points, to suppress the Rayleigh backscattering signal by allowing only the pump signal to pass.

2. An optical signal processor device according to claim 1, characterized in that the divertor means comprise two circulators, each disposed at one of the points of connection of the optical propagation medium to the optical transmission means, to cause the information-carrying signal to travel in the optical transmission means, and to cause the back-propagated signals to travel in the optical propagation medium between the two circulators.

3. An optical signal processor device according to claim 1, characterized in that it further comprises an optical functional module disposed on the optical transmission means (10) between the two circulators.

4. An optical signal processor device according to claim 3, characterized in that the optical functional module comprises an optical add/drop multiplexer for adding and dropping wavelengths and/or an optical switch and/or a polarization mode dispersion compensator and/or an optical regenerator.

5. An optical signal processor device according to any one of claims 1 to 4, characterized in that the signal discrimination means comprise a band-pass filter centered on the wavelength of the Raman pump signal intended to be propagated in the optical transmission means.

6. An optical signal processor device according to claim 4, characterized in that the signal discrimination means (22) comprise a Bragg grating fiber whose reflection wavelength corresponds to the wavelength of the Rayleigh backscattering signal derived from the information-carrying signal.

7. An optical signal processor device according to claim 6, for use with means for optically transmitting a plurality of information-carrying signals, which device is characterized in that the signal discrimination means comprise a plurality of Bragg gratings disposed in series with reflection wavelengths corresponding to respective wavelengths carrying backscattered signals derived from the plurality of information-carrying signals.

8. An optical signal processor device according to claim 6, for use with means for optically transmitting a plurality of information-carrying signals and characterized in that the signal discrimination means comprise an optical signal demultiplexer adapted to transmit only certain signals of predetermined wavelengths and associated with an optical signal multiplexer.

9. An optical signal processor device according to claim 8, characterized in that the optical transmission means include a line optical fiber and the optical propagation medium comprises an optical fiber portion.

10. An optical signal transmission installation comprising a distributed Raman amplification system, characterized in that it further comprises an optical signal processor device according to claim 9.

11. An optical signal processor device for use with means for optically transmitting a plurality of information-carrying signals propagating in optical transmission means at different wavelengths and a plurality of back-propagated pump signals for amplifying said information-carrying signal, said device comprising:

means for suppressing backscattered signals in the optical transmission means, an optical propagation medium, and divertor means arranged for connecting, in parallel, at two connection points, the optical propagation medium to the optical transmission means, and suitable for diverting, to said optical propagation medium, the back-propagated signals in the optical transmission means, in which the backscattered signal suppression means are means for discriminating between a plurality of pump signals intended to be back-propagated in the optical transmission means and Rayleigh backscattering signals, said discrimination means being connected to the optical propagation medium to suppress the Rayleigh backscattering signals by filtering that passes the pump signals only.

12. An optical signal processor device arranged for being fitted to means for optically transmitting an information-carrying signals and back-propagated pump signal for amplifying said information-carrying signal, said device comprising means for suppressing backscattered signals in the optical transmission means;

an optical propagation medium arranged for being connected in parallel with the optical transmission means, divertor means being arranged for connecting, in parallel, at two connection points, the optical propagation medium to the optical transmission means, the divertor means comprising two circulators, each disposed at one of the connection points, to cause the information-carrying signal to travel in the optical transmission means, and to cause any back propagated signal to travel in the optical propagation medium between the two circulators, at least a portion of the means for optically transmitting an information-carrying signal extending between the two circulators, and wavelength discrimination means for discriminating between said pump signal and a Rayleigh backscattering signal, these signals being diverted by the divertor means to the optical propagation medium, said discrimination means being connected to the optical propagation medium, between the two connection points, to suppress the Rayleigh backscattering signal by allowing only the pump signal to pass.

13. An optical signal processor device arranged for being fitted to means for optically transmitting an information-carrying signal and a back-propagated pump signal for amplifying said information-carrying signal, said device comprising:

means for suppressing backscattered signals in the optical transmission means;

an optical propagation medium arranged for being connected in parallel with the optical transmission means, divertor means being arranged for connecting, in parallel, at two connection points, the optical propagation medium to the optical transmission means and being arranged for diverting to said optical propagation medium said back-propagated signals in the optical transmission means, at least a portion of the means for optically transmitting an information-carrying signal extending between the two divertor means, and discrimination means for discriminating between said pump signal and a Rayleigh backscattering signal, said discrimination means being connected to the optical propagation medium to suppress by filtering Rayleigh backscattering signal and to allow only said pump signal to pass, the signal discrimination means comprising a Bragg grating fiber whose reflection wavelength corresponds to the wavelength of said Rayleigh backscattering signal derived from the information-carrying signal.

14. An optical signal processor device arranged for being fitted to means for optically transmitting an information-carrying signal and a back-propagated pump signal for amplifying said information-carrying signal, said device comprising:

means for suppressing backscattered signals in the optical transmission means, an optical propagation medium arranged for being connected in parallel with the optical transmission means, divertor means being arranged for connecting, in parallel, at two connection points, the optical propagation medium to the optical transmission means and being arranged for diverting to said optical propagation medium said back-propagated pump signals in the optical transmission means, at least a portion of the means for optically transmitting an information-carrying signal extending between the two divertor means, and discrimination means for discriminating between said pump signal and a Rayleigh backscattering signal, said discrimination means being connected to the optical propagation medium to suppress by filtering the Rayleigh backscattering signal and to allow only said pump signal to pass, the signal discrimination means comprising a band-pass signal centered on the wavelength of the Raman pump signal intended to be propagated in the optical transmission means.

15. An optical signal processor device according to claim 1, wherein said means for optically transmitting the information-carrying signal are adapted to transmit a plurality of information-carrying signals propagating at different wavelength and wherein said discrimination means are adapted to suppress a plurality of Rayleigh backscattering signals each associated with a corresponding information-carrying signal while allowing a plurality of pump signals to pass, each pump signal being associated with a corresponding information-carrying signal.

* * * * *